Sept. 17, 1968  W. O. MUNROE  3,401,666

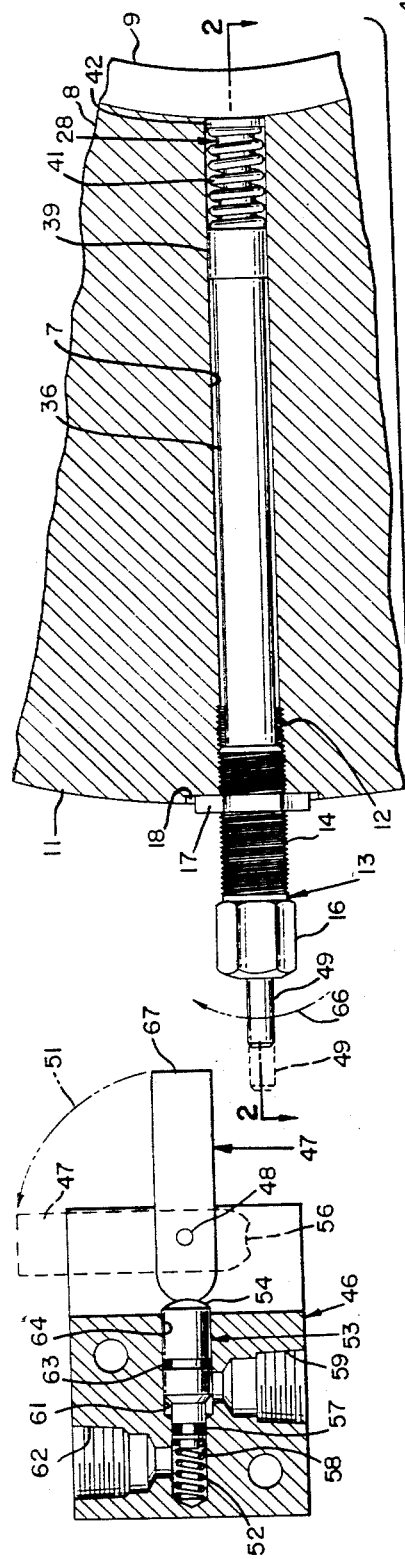
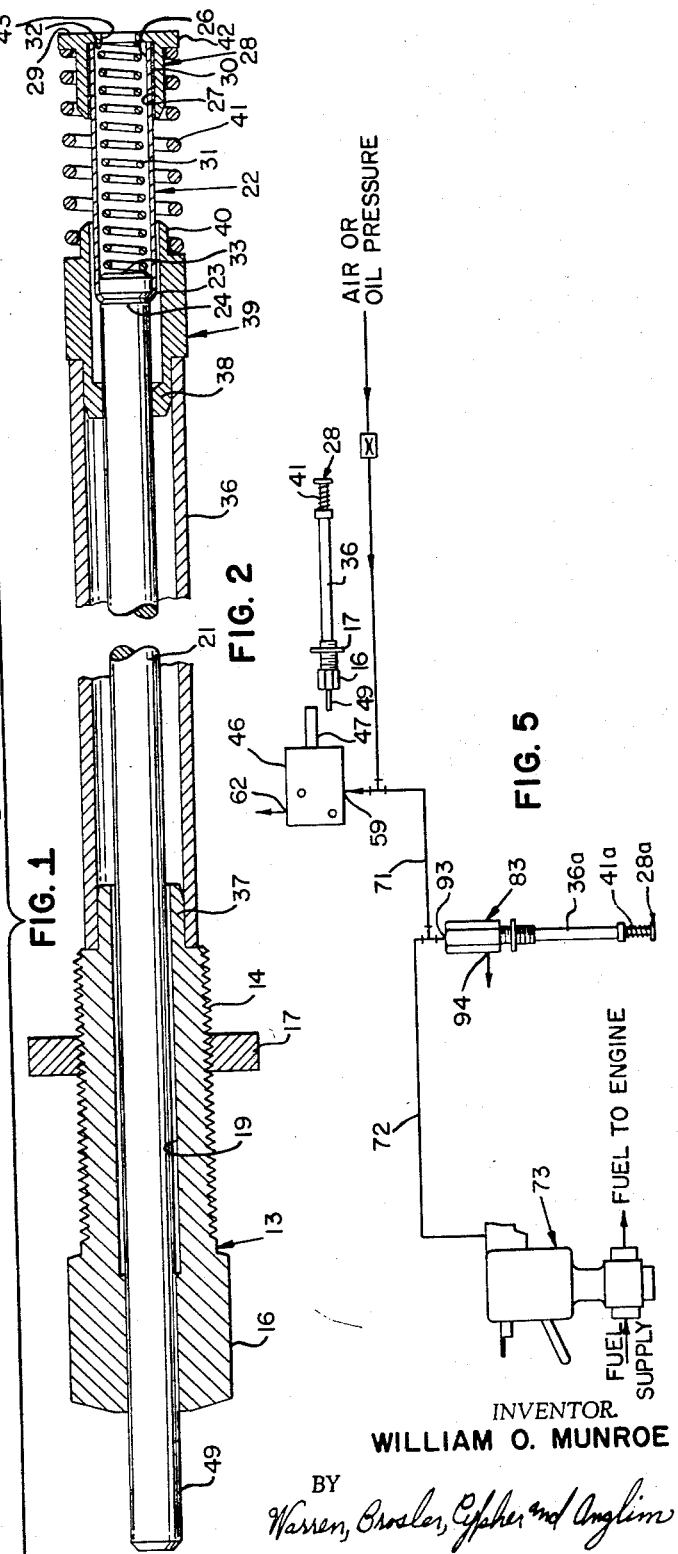

TEMPERATURE DETECTING ACTUATOR FOR BEARINGS

Filed June 30, 1965  2 Sheets-Sheet 2

INVENTOR.
WILLIAM O. MUNROE
BY
Warren, Brosler, Cypher and Anglim
ATTORNEYS

United States Patent Office 3,401,666
Patented Sept. 17, 1968

3,401,666
TEMPERATURE DETECTING ACTUATOR
FOR BEARINGS
William O. Munroe, Rodeo, Calif., assignor to Amot Controls Corporation, a corporation of California
Filed June 30, 1965, Ser. No. 468,207
7 Claims. (Cl. 116—114.5)

ABSTRACT OF THE DISCLOSURE

A bearing temperature alarm having a pair of temperature sensing and spring actuated parts which are telescopically mounted for sliding engagement of their opposed walls, and urged to a relatively expanded position by a spring, and held in a relatively contracted position against the resilient action of the spring by a thin film of fusible material bonded between such walls.

The invention relates to devices for detecting excessive temperatures in bearings and specifically to devices which co-function with systems for automatically shutting down an engine or compressor upon the occurrence of excessive temperatures.

Bearing failures on large internal combustion engines are a very serious and expensive type of trouble. Actual and incidental costs can run to many thousands of dollars. If a failure or incipient failure can be detected soon enough, the damage can be limited to the bearing itself and the cost will be the labor and parts for installing a new bearing and loss of revenue for a relatively short down time. If, however, the failure is not detected early, the damage may extend to a wrecked connecting rod and crankshaft and possible crankcase explosion, and the costs will increase enormously. A bearing failure always results in a rise in temperature of the bearing itself, and this temperature rise and resulting destruction of the bearing can be very rapid, sometimes in a matter of seconds. In spite of all precautions against bearing failures, they sometimes do occur, so that the next line of defense is to try to limit the damage to the loss of the bearing shell only.

Accordingly, it is an object of the present invention to provide a detecting device which can react to a temperature rise of only a few degrees above the normal operating temperature of a bearing and shut down the engine before damage to the engine becomes severe.

Another object of the present invention is to provide a device which may be installed with its temperature sensitive element very close to the source of heat and which can react immediately after the pre-determined rise in temperature has occured.

A further object of the present invention is to provide a precise, dependable and inexpensive device which may be inexpensively installed and reset in an engine or compressor bearing.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and descriptions may be adopted within the scope of the invention as set forth in the claims.

Referring to said drawings (two sheets):

FIGURE 1 is a side elevation view of the device constructed in accordance with the present invention, and mounted in a connecting rod bearing shown in cross section for purposes of clarity and positioned in operative relation to a relay device shown partially in cross section.

FIGURE 2 is an enlarged cross section view of the device taken substantially along the line 2—2 in FIGURE 1.

FIGURE 5 is a schematic of an automatic engine shutdown control system showing the device and its modified form installed therein.

Figure 4:
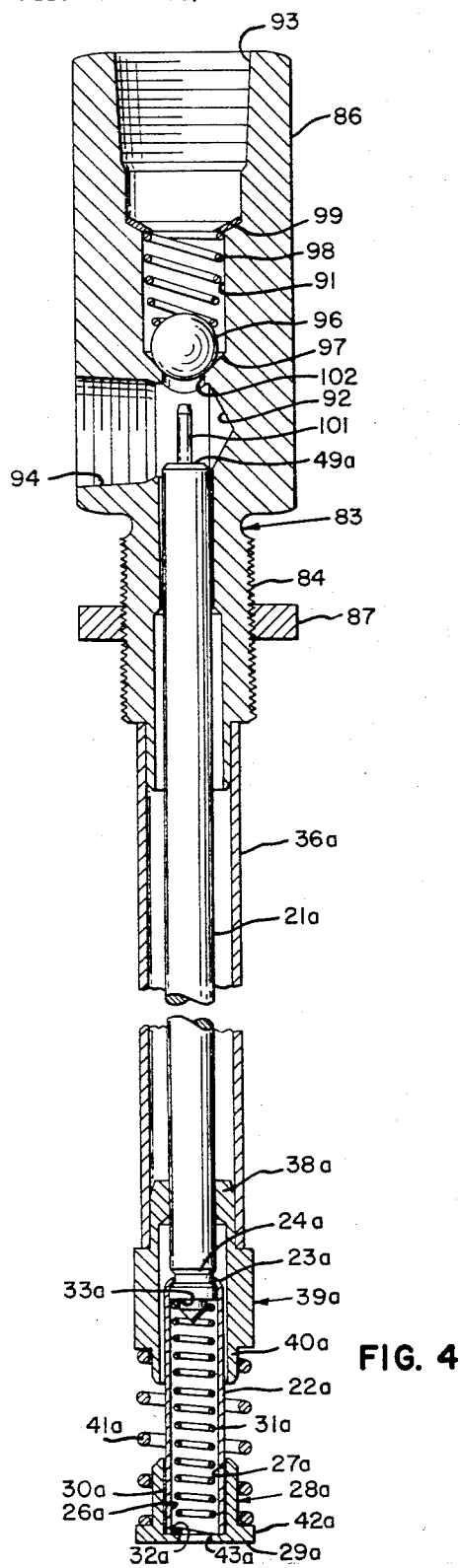
FIGURE 4 is an enlarged cross sectional view of the device shown in FIGURE 3 taken substantially along the line 4—4.

The temperature detecting device of the present invention for a bearing consist briefly of a member mounted in the bearing; and a spring loaded actuator mounted in thermal connection with the bearing and releasably connected to the member by a thin film of material fusible at a preselected temperature, the actuator in the released position being adapted for co-functioning with means functioning to relay a signal indicating that excessive heat has developed in the bearing.

The basic device is particularly adaptable to large engine connecting rod bearings as well as journal bearings with some modifications. A preferred embodiment of the device for connecting rod bearings is here shown in FIGURES 1 and 2. The device is mounted in a bore 7 drilled in a bearing cap 8 exposing the bearing insert 9. The bore adjacent the periphery 11 of the bearing cap is formed with internal threads 12. A body member 13 having external threads 14 matching threads 12 connects the device to the bearing cap. The body member is formed with a hex head 16 for implementing attachment of the device. A locking nut 17 provided with internal threads matching the external threads 14 is provided to keep the device in place and is seated on a countersunk portion 18 in the periphery of the bearing cap. The body member is formed with a bore 19 for slidably receiving an elongated rod 21.

A sleeve 22 is connected to the rod by bending end 23 so as to grasp the edges of a groove 24 formed in the rod. The opposite end 26 of the sleeve is dimensioned to be slidably received in a bore 27 formed in a spring retainer member 28. As shown in FIGURE 1, the end 29 of the spring retainer is in direct contact with the bearing insert and is made from a heat conducting material which transmits the bearing heat to its inner bore 27. The inner bore 27 of the retainer is connected to the outer cylindrical surface of end 26 of the sleeve by a fusible alloy 30 which solders the parts together. In order to provide for immediate release of the parts, a fusible alloy is selected that is capable of melting within a very narrow temperature range. Different melting temperatures are required in different applications and trip temperatures, as for example, 174, 197, 228, and 253 degrees F. are commonly specified.

The use of a thin film of fusible alloy placed near the source of heat, assures almost instantaneous melting of all of the alloy thus freeing the parts for rapid separation the instant the pre-selected excessive temperature is reached in the bearing. Snap-action movement of the actuator is attained by the use of a compression spring 31 installed within sleeve 22 bearing against face 32 of the spring retainer and end face 33 of the actuator rod. The travel of the rod may be varied within practical limits and movement of approximately $5/16$ inch is sufficient.

The length of the actuator rod varies depending upon the thickness of the bearing cap. For the length here shown, it is preferable to provide a tube 36 connected to a reduced diameter neck portion 37 of the body and to a reduced diameter neck portion 38 of a spring retainer 39. A compression spring 41 is connected to an annular flange 42 of spring retainer 28 and the other end is connected to spring retainer 39 at reduced diameter portion 40. Thus when body member 13 is connected to the bearing cap, compression spring 41 biases spring retainer 42 toward the bearing shell. End 29 of the spring retainer is provided with an opening 43 providing access to the inner portion of sleeve 22.

The device as installed in FIGURE 1 may be used to actuate various devices and is here shown in operative relation to a vent valve 46 provided with a lever 47 pivotally mounted at point 48. When end 49 of the actuator rod is actuated and assumes the position shown in broken lines in FIGURE 1, lever 47 moves in the direction of arrow 51 and assumes the position shown in broken lines.

Lever 47 is normally held in the upright position by means of the pressure maintained by compression spring 52 acting on reciprocating piston 53 and urging the convex surface 54 of the piston into engagement with the concave surface 56 of the lever. In the normal position of the valve, O ring 57 mounted on the piston in sealing engagement with chamber 58 prevents the flow of fluid from inlet port 59 through passage 61, chamber 58 and to vent valve port 62. O ring 63 prevents leakage through cylindrical chamber 64. Upon movement of the lever as indicated by arrow 51, spring 52 forces piston 53 upwardly permitting communication between inlet port 59 and vent port 62.

In operation, the actuator mounted on a connecting rod bearing cap 8 would move in a direction as shown by arrow 66. The end 49 of the actuator rod would be positioned so as to clear the end 67 of valve lever 47. The vent valve should be installed above the oil level in the sump. This makes a visual check possible and aids in resetting the valve. This installation further prevents the possibility of "drag" tripping the lever when the actuator rod tip passes by in very cold oil.

When the temperature of the bearing exceeds the normal operating temperature by a pre-seelcted amount, the fusible alloy 30 melts and compression spring 31 snaps rod end 49 to the position shown in broken lines in FIGURE 1 and trips lever 47 opening the vent valve. As shown in the schematic drawing of FIGURE 5, venting of pressure in line 71 connected to line 72 which is in turn connected to a valve 73 shuts off the fuel supply to the engine when the pressure in line 72 is released.

Figure 3:
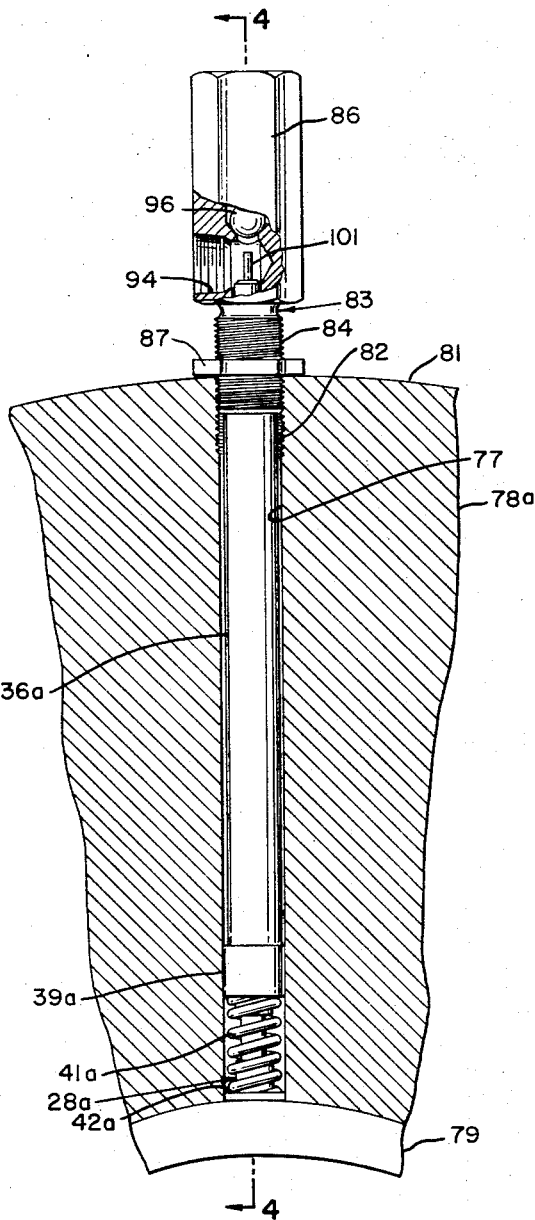
FIGURE 3 is an elevation view of a modified form of the device with portions broken away for purposes of clarity and shown mounted in a portion of a journal bearing shown in cross section.

Turning to the modified form of the invention shown in FIGURES 3 and 4, the fuse assembly is identical to the previously above-described assembly and here consists of an actuator rod 21a, a sleeve 22a having an end 23a attached to a groove 24a, a spring retainer member 28a having an end 29a, a face 32a, an annular flange 42a, an opening 43a formed with a bore 27a for receiving the opposite end 26a of sleeve 22a, a compression spring 31a, a tube 36a, a spring retainer 39a having a neck portion 38a at one end and a reduced neck portion 40a at the other end, and a spring 41a. Compression spring 31a bears against end face 33a of the actuator rod. The same fusible alloy designated as 30a is used in the modified form.

The modified device shown in FIGURES 3 and 4 is preferably used in journal bearing installations by inserting the fuse assembly into a bore 77 of a journal bearing cap 78 having a journal bearing insert 79. A portion of the bore adjacent the periphery 81 of the bearing cap is formed with threads 82 matching external threads 84 of body member 83. The body member is formed with a hex head portion 86 to facilitate connection of the device to the bearing. A locking nut 87 having internal threads matching threads 84 of the body member is used to secure the device to the bearing.

Where the device is attached to a bearing which does not move such as a journal bearing, the body member 70 of the device may be constructed so that the means functioning to relay a signal indicating that excessive heat has developed in the bearing may be formed as a part of the device. As shown in FIGURES 3 and 4, the signalling means consists of a valve in which the body member defines a pair of intercommunicating chambers 91 and 92 communicating with an inlet port 93 and an outlet port 94. A resilient ball 96 is biased toward valve seat 97 by compression spring 98 held in place by retaining spring 99. Ball 96 is lifted off its seat by a pin 101 connected to an end 49a of actuator rod 21a.

The operation of the modified device is identical to the device for the connecting rod described above except for the fact that pin 101 lifts ball 96 off its seat and permits fluid pressure to vent through passage 102 and out vent port 94. As shown in the schematic of FIGURE 5, venting of port 94 reduces the pressure to fuel valve 73 which automatically cuts off the fuel to the engine thereby shutting it down and avoiding destructive loss due to an over heating bearing.

I claim:
1. A temperature detecting actuator for a connecting rod bearing having a bearing cap and a bearing insert comprising:
   a spring seat adapted for mounting within said bearing cap adjacent said bearing insert and being formed with an annular axially elongated surface area;
   an elongated member having a surface area in sliding registration with said spring seat annular surface area;
   said spring seat and said member being releasably connected at said surface areas by a thin film of fusible material in shear selected for melting at a pre-selected temperature above the normal operating temperature of said bearing;
   spring means seated on said spring seat and biasing said member to a first actuated position upon melting of said eutectic film;
   a body member adapted for attachment to said bearing cap and formed for slidably receiving said member; and
   a device mounted adjacent said actuator having a pivotally mounted lever co-functioning with the distal end of said actuated member and functioning to relay a signal indicating excessive temperature in said bearing.

2. A temperature detecting actuator for connecting rod bearings having a bearing cap and a bearing insert comprising:
   a body member threadably connected to the walls of a bore in said bearing cap for axial movement toward said bearing insert;
   an elongated actuator rod having first and second spaced ends mounted for axial movement in said body from a first position to an actuated second position;
   a sleeve connected to said first rod end and extending axially therefrom;
   a spring retainer having an externally projecting flange and formed with a bore for receiving an end of said sleeve, said sleeve and said spring retainer being releasably connected by a thin film of material fusible at a pre-selected temperature above normal operating temperature of said bearing;
   first compression spring means slidably mounted within said sleeve in engagement with said spring retainer and said first rod end for biasing said rod to said actuated position;
   second compression spring means connected to said body member and said spring retainer flange for biasing said spring retainer toward said bearing insert; and
   a device positioned adjacent said second rod end and co-functioning therewith in the released position for relaying a signal to indicate that excessive heat has developed in said bearing.

3. A temperature detecting and signaling device for a journal bearing comprising:
   a body member defining a pair of intercommunicating chambers communicating with an inlet and an outlet port and mounted on said journal bearing;

spring biased valve means mounted in one of said chambers and normally preventing communication between said chambers;

a push rod slidably mounted on said body for movement from a first position to an actuated second position co-functioning with said valve means to permit communication between said inlet and outlet ports;

a spring retainer thermally connected to said bearing;

a compression spring connected to said spring retainer and biasing said push rod to said actuated second position; and a sleeve connected to said push rod and releasably connected to said spring retainer by a thin film of fusible material in shear and selected to melt at a pre-selected temperature above the normal operating temperature of said bearing and to release said sleeve and permit said rod to open said valve means.

4. A temperature detecting actuator for a journal bearing having a bearing cap and a bearing insert comprising:

a body member defining a pair of intercommunicating chambers communicating with an inlet and an outlet port and mounted in said journal bearing cap;

spring biased valve means mounted in one of said chambers and normally preventing communication between said chambers;

a push rod slidably mounted on said body for movement from a first position to an actuated second position co-functioning with said valve means to permit communication between said inlet and outlet ports;

a sleeve connected to said first rod end and extending axially therefrom;

a spring retainer having an externally projecting flange and formed with a bore for receiving an end of said sleeve, said sleeve and said spring retainer being releasably connected by a thin film of material fusible at a pre-selected temperature above normal operating temperature of said bearing;

first compression spring means slidably mounted within said sleeve in engagement with said spring retainer and said first rod end for biasing said rod to said actuated position for actuating said valve; and second compression spring means connected to said body member and said spring retainer flange for biasing said spring retainer toward said bearing insert.

5. A temperature detecting device for a bearing comprising, a pair of telescopically mounted temperature sensing and spring actuated parts adapted for mounting in heat conducting relation to a bearing and having telescopically opposed metallic walls with sliding clearance space therebetween for movement of said parts between relatively contracted and expanded positions, spring means urging said parts from contracted to expanded position, and a film of metallic fusible material mounted in said clearance space and bonded to said walls over the major common portion thereof and operating in shear to hold said parts in contracted position against the action of said spring means whereby upon heating of said parts to a predetermined melting temperature of said fusible material said parts will be displaced to expanded position by said spring means.

6. A temperature detecting device for a connecting rod bearing having a bearing insert and a bearing cap with an opening therein extending at least substantially to said insert comprising, the device defined in claim 5 wherein one of said parts is a spring seat adapted for mounting at the base of said opening in heat conducting relation to said insert.

7. A temperature detecting and signalling device for a bearing journal comprising, the device defined in claim 5, and valve means mounted for engagement and actuation by one of said parts upon displacement of said parts to expanded position.

References Cited

UNITED STATES PATENTS

| | | | |
|---|---|---|---|
| 3,140,611 | 7/1964 | Kleiwer | 73—358 |
| 3,290,942 | 12/1966 | Carbaugh et al. | 116—114.5 XR |
| 1,058,993 | 4/1913 | Marvin | 246—169 |
| 1,675,780 | 7/1928 | Alric | 116—114.5 X |
| 2,065,614 | 9/1936 | Scribner | 116—114.5 |
| 2,952,238 | 9/1960 | Barber. | |

FOREIGN PATENTS 122,606  5/1931  Austria.

DAVID SCHONBERG, *Primary Examiner.*

FREDERICK SHOON, *Assistant Examiner.*